(12) United States Patent
Hur

(10) Patent No.: US 9,694,864 B2
(45) Date of Patent: Jul. 4, 2017

(54) JIG DEVICE FOR TRUNK LID

(71) Applicant: Hyundai Motor Company, Seoul (KR)

(72) Inventor: Gwang Bok Hur, Ulsan (KR)

(73) Assignee: Hyundai Motor Company, Seoul (KR)

( * ) Notice: Subject to any disclaimer, the term of this patent is extended or adjusted under 35 U.S.C. 154(b) by 292 days.

(21) Appl. No.: 14/108,201

(22) Filed: Dec. 16, 2013

(65) Prior Publication Data

US 2015/0068004 A1 Mar. 12, 2015

(30) Foreign Application Priority Data

Sep. 9, 2013 (KR) .................. 10-2013-0107942

(51) Int. Cl.
*B62D 65/06* (2006.01)
*B62D 65/02* (2006.01)
*B23K 101/00* (2006.01)

(52) U.S. Cl.
CPC ........... *B62D 65/06* (2013.01); *B62D 65/026* (2013.01); *B23K 2201/006* (2013.01); *Y10T 29/49895* (2015.01); *Y10T 29/53978* (2015.01)

(58) Field of Classification Search
CPC ...... B62D 65/06; B62D 65/026; B62D 65/02; B62D 25/087; B23K 2201/006; Y10T 29/53978; Y10T 29/49902; Y10T 29/49895; E05B 17/06
USPC ............................ 29/281.5, 468, 464; 269/76
See application file for complete search history.

(56) References Cited

U.S. PATENT DOCUMENTS

| | | | | |
|---|---|---|---|---|
| 5,283,937 A * | 2/1994 | Uesugi | .................. | B62D 65/06 29/281.5 |
| 5,694,675 A * | 12/1997 | Pasternak | ............... | E05B 17/06 29/271 |
| 6,006,635 A * | 12/1999 | Stojkovic | ............ | B25B 27/0035 81/484 |
| 6,711,800 B2 * | 3/2004 | Savoy | .................... | B62D 65/06 29/281.5 |
| 7,044,706 B2 * | 5/2006 | Jung | .................... | B25J 15/0052 294/119.1 |
| 8,117,723 B2 * | 2/2012 | Jin | ......................... | B62D 65/04 29/281.5 |
| 8,220,122 B2 * | 7/2012 | Lee | ........................ | B62D 65/06 29/283 |

(Continued)

FOREIGN PATENT DOCUMENTS

DE 102013003074 A1 * 8/2014
FR 2933949 A1 * 7/2008

(Continued)

*Primary Examiner* — Larry E Waggle, Jr.
*Assistant Examiner* — Mahdi H Nejad
(74) *Attorney, Agent, or Firm* — Morgan Lewis & Bockius LLP

(57) ABSTRACT

A jig device for a trunk lid includes a jig part capable of assembling a trunk lid to a trunk body of a vehicle in the state in which the trunk lid is closed, wherein the jig part is configured to include a jig body mounted on the trunk body, first and second jigs mounted on the jig body to determine a position of the trunk lid in a Y direction, a third jig mounted on the jig body to determine a position of the trunk lid in a Z direction, a fourth jig mounted on the jig body to guide the trunk lid in the Y direction, and a fifth jig mounted on the jig body to determine a position of the trunk lid in an X direction.

7 Claims, 7 Drawing Sheets

(56) References Cited

U.S. PATENT DOCUMENTS

| | | | | |
|---|---|---|---|---|
| 8,905,390 | B2* | 12/2014 | Yeum | B23K 37/0443 269/55 |
| 9,296,063 | B2* | 3/2016 | Lee | B23K 11/315 |
| 2003/0019090 | A1* | 1/2003 | Matsumoto | B62D 65/02 29/428 |
| 2004/0168290 | A1* | 9/2004 | Park | B23P 19/00 29/281.5 |
| 2006/0013646 | A1* | 1/2006 | Baulier | B23K 37/04 403/326 |
| 2006/0262325 | A1* | 11/2006 | Tassakos | B62D 65/06 356/625 |
| 2009/0265888 | A1* | 10/2009 | Lee | B62D 65/06 16/252 |
| 2009/0326701 | A1* | 12/2009 | Tassakos | B62D 65/06 700/108 |
| 2011/0160905 | A1* | 6/2011 | Asamizu | B25J 15/0019 700/258 |
| 2012/0117783 | A1* | 5/2012 | Hasegawa | B21D 39/021 29/509 |
| 2012/0137490 | A1* | 6/2012 | Kweon | B23K 31/02 29/428 |
| 2012/0137503 | A1* | 6/2012 | Park | B62D 65/026 29/559 |
| 2013/0113149 | A1* | 5/2013 | Yeum | B23K 37/0443 269/59 |
| 2014/0165364 | A1* | 6/2014 | Labbe | B23P 19/04 29/464 |
| 2014/0366352 | A1* | 12/2014 | Jang | B62D 65/026 29/281.1 |
| 2015/0013133 | A1* | 1/2015 | Lee | B62D 65/06 29/281.6 |
| 2015/0090699 | A1* | 4/2015 | Lee | B23K 11/315 219/86.8 |
| 2015/0239400 | A1* | 8/2015 | Tanaka | B62D 25/087 296/37.1 |

FOREIGN PATENT DOCUMENTS

| | | |
|---|---|---|
| FR | 2 933 949 A1 | 1/2010 |
| FR | 2933949 A1 * | 1/2010 |
| FR | 2962106 A1 * | 7/2010 |
| FR | 3010688 A1 * | 9/2013 |
| JP | 02279477 A * | 11/1990 |
| JP | 2003-95158 A | 4/2003 |
| JP | 2003095158 A * | 4/2003 |
| KR | 96-010270 B1 | 7/1996 |
| KR | 960010270 B1 | 7/1996 |
| KR | 1019990034802 A | 5/1999 |
| KR | U1999-0026051 U | 7/1999 |
| WO | WO 2012/001253 A1 | 1/2012 |
| WO | WO2012/001253 A1 * | 1/2012 |
| WO | WO 2012001253 A1 * | 1/2012 |

* cited by examiner

JIG DEVICE FOR TRUNK LID

CROSS-REFERENCE TO RELATED APPLICATION

The present application claims priority of Korean Patent Application Number 10-2013-0107942 filed Sep. 9, 2013, the entire contents of which application is incorporated herein for all purposes by this reference.

BACKGROUND OF INVENTION

Field of Invention

The present invention relates to a jig device for a trunk lid, and more particularly, to a jig device for a trunk lid capable of allowing the trunk lid to be mounted on a trunk body in the state in which the trunk lid is closed at the time of being mounted.

Description of Related Art

Generally, in a vehicle assembling line, components such as a door, a bonnet, a trunk lid, and the like, have been mounted at appropriate places on a vehicle body. However, at the time of performing this work, high assembling precision is required.

To this end, a system of using a special assembling jig configured to be appropriate for the respective components to determine positions of the components and assemble the components to the vehicle body at the determined positions has been conventionally used.

Describing a process of assembling a trunk lid among them to a trunk body, a hinge enabling rotation of the trunk lid is mounted at one end of the trunk body, a jig is mounted so that the trunk lid is easily mounted, and the trunk lid is then assembled in the state in which it is opened.

However, the trunk lid to the prior art is assembled only in the state in which it is opened due to the hinge and the jig. Therefore, according to the prior art, since the trunk lid is assembled in the state in which it is opened at the time of being mounted, it is difficult to confirm a clearance generated between the trunk body and the trunk lid, such that marketability is decreased and work convenience is decreased due to a work for adjusting it.

An exemplare of a known device is Korean Patent Laid-Open Publication No. 10-1993-0009852.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, various aspects of the present invention has been made to solve the above-mentioned problems occurring in the prior art while advantages achieved by the prior art are maintained intact.

Various aspects of the present invention provide for a jig device for a trunk lid capable of allowing the trunk lid to be mounted on a trunk body in the state in which the trunk lid is closed at the time of being mounted.

Various aspects of the present invention provide for a jig device for a trunk lid including: a jig part assembling a trunk lid to a trunk body of a vehicle in the state in which the trunk lid is closed, wherein the jig part includes: a jig body mounted in a front and rear direction of the vehicle on a side of the trunk body; a first jig disposed at the front of the jig body to allow the jig part to position the trunk lid in a Y direction on the side of the trunk body; a second jig disposed at the center of the jig body to allow the jig part to position the trunk lid in the Y direction on the corner of the trunk body; a third jig disposed at an inner side of the first jig to determine a position of the trunk lid in a Z direction; a fourth jig disposed at an inner side of the center of the jig body to guide the trunk lid in the Y direction; and a fifth jig disposed at the rear of the jig body and extended toward an inner side of a trunk of the vehicle to determine a position of the trunk lid in an X direction.

The X direction may be a front and rear direction of the vehicle, the Y direction may be a left and right direction of the vehicle, and the Z direction may be a top and bottom direction of the vehicle.

The jig body may have a knob formed on an upper surface thereof.

A distal end of the fifth jig may be provided with a support part bent.

A lower portion of the third jig and the support part of the fifth jig may be provided with a magnetic block.

A plurality of fourth jigs may be provided so as to be spaced apart from each other by a predetermined gap.

A plurality of jig parts may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
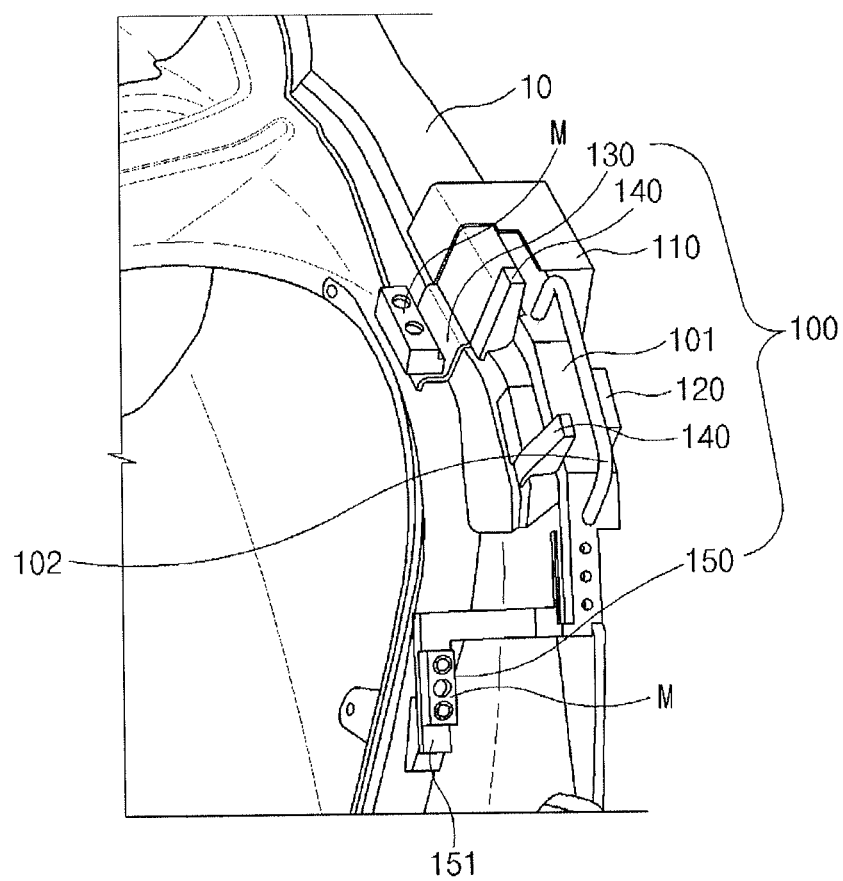
FIG. 1 and FIG. 2 are views showing the state in which an exemplary jig device for a trunk lid according to the present invention is mounted on a trunk body.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A jig device for a trunk lid according to various embodiments of the present invention includes a jig part 100 capable of assembling a trunk lid 11 to a trunk body 10 of a vehicle in the state in which the trunk lid 11 is closed, wherein the jig part 100 is configured to include a jig body 101 mounted on the trunk body 10, first and second jigs 110 and 120 mounted on the jig body 101 to determine a position of the trunk lid 11 in a Y direction, a third jig 130 mounted on the jig body 101 to determine a position of the trunk lid 11 in a Z direction, a fourth jig 140 mounted on the jig body 101 to guide the trunk lid 11 in the Y direction, and a fifth jig 150 mounted on the jig body 101 to determine a position of the trunk lid 11 in an X direction, as shown in FIGS. 1 to 8.

As shown in FIGS. 1 to 5, the jig part 100 is mounted on the trunk body 10 of the vehicle to allow the trunk lid 11 to be assembled in the state in which the trunk lid 11 is closed, thereby making it possible to decrease a gap step.

Figure 6:
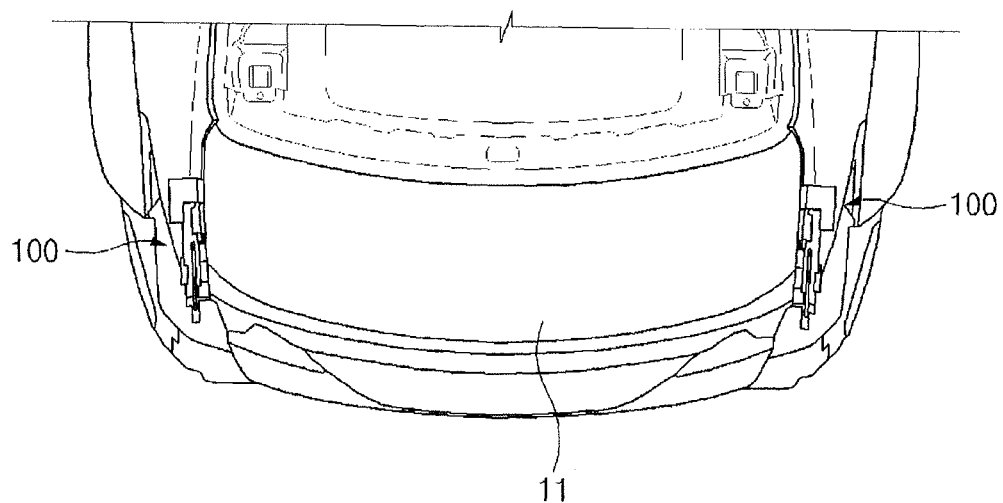
FIG. 6 and FIG. 7 are views showing an example of an exemplary jig device for a trunk lid according to the present invention.
Figure 7:
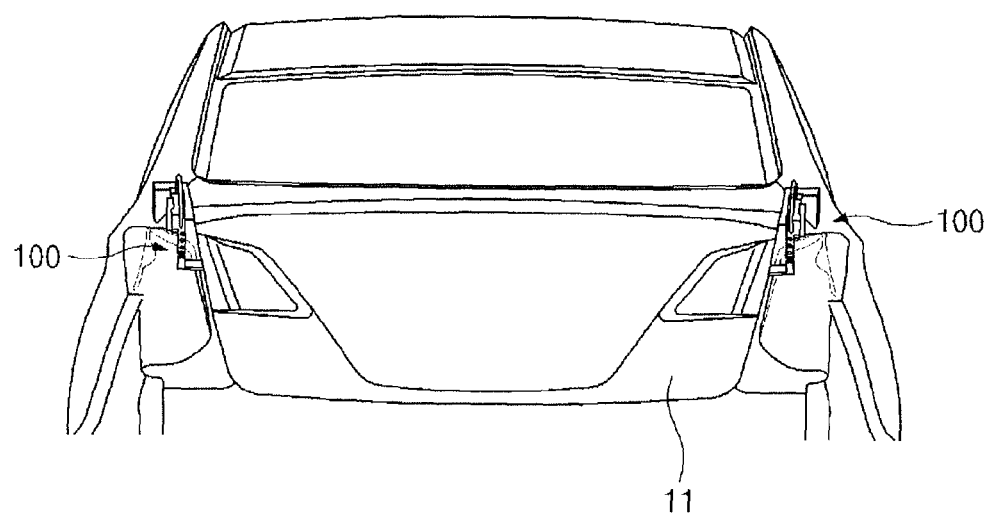

Here, a plurality of jig parts 100 may be provided and are mounted on both ends of the trunk body 10 to further facilitate a process of assembling the trunk lid 11, as shown in FIGS. 6 and 7.

The jig part 100 is configured to include the jig body 101, the first jig 110, the second jig 120, the third jig 130, the fourth jig 140, and the fifth jig 150.

Figure 2:
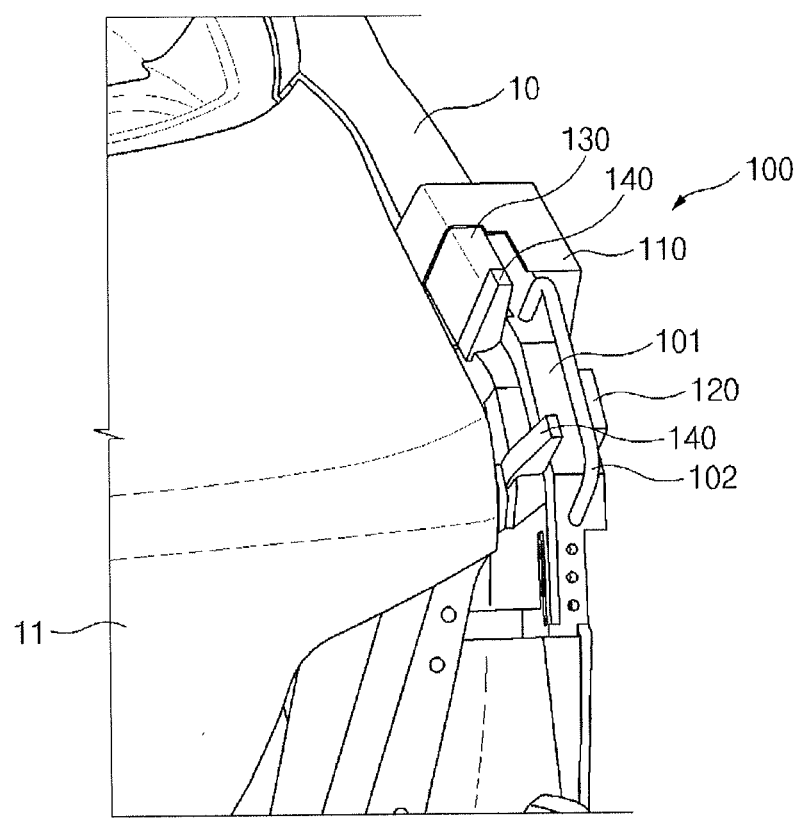
Figure 3:
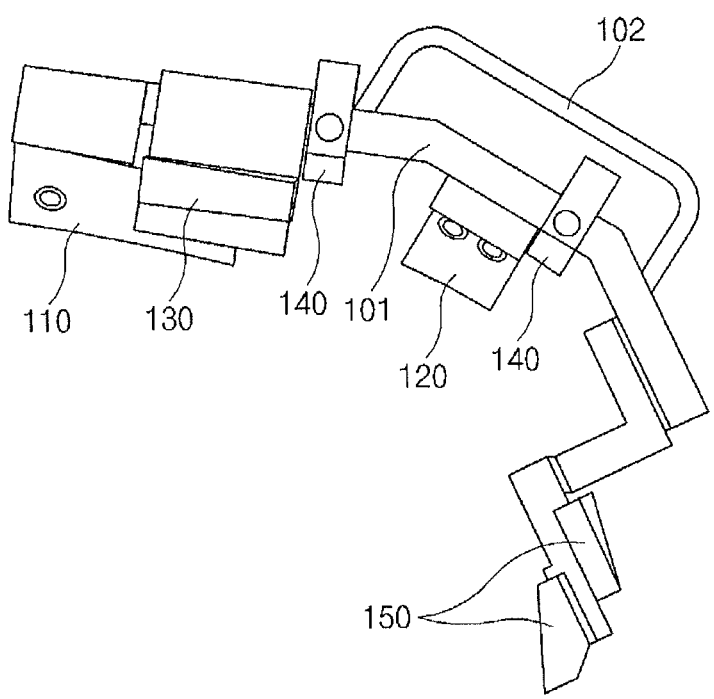
FIG. 3, FIG. 4 and FIG. 5 are views showing an exemplary jig device for a trunk lid according to the present invention.
Figure 4:
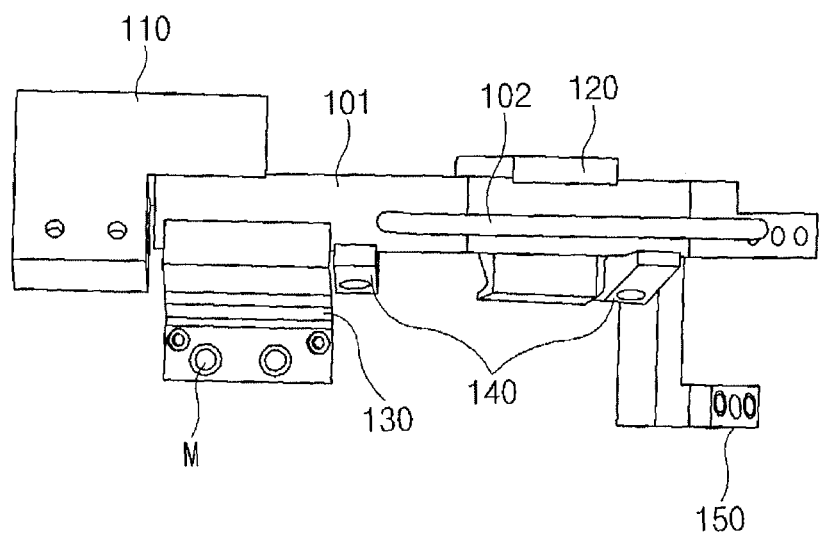

The jig body 101, which is a component forming a body of the jig part 100, has a bar shape in which a central portion thereof is bent downward, as shown in FIGS. 1 to 3, so as to be mounted in a front and rear direction of the vehicle on a side of the trunk body 10.

Here, the jig body 101 has a knob 102 formed on an upper surface thereof, thereby making it possible to improve work convenience when mounting the jig part 100 on the trunk body 10 or separating the jig part 100 from the trunk body 10.

The first jig 110 may be disposed at the front of the jig body 101 to allow the jig part 100 to position the trunk lid 11 in the Y direction on the side of the trunk body 10.

Here, the Y direction refers to a left and right direction of the vehicle, a Z direction to be described below refers to a top and bottom direction of the vehicle, and the X direction refers to a front and rear direction of the vehicle.

The second jig 120 may be disposed at the center of the jig body 101 to allow the jig part 100 to position the trunk lid 11 in the Y direction on the corner of the trunk body 10.

As described above, the first and second jigs 110 and 120 may be disposed at the front and the center of the jig body 101, respectively, to allow the trunk lid 11 to be positioned in the Y direction (that is, the left and right direction of the vehicle).

The third jig 130 is disposed at an inner side of the first jig 110 to determine a position of the trunk lid 11 in the Z direction.

Figure 5:
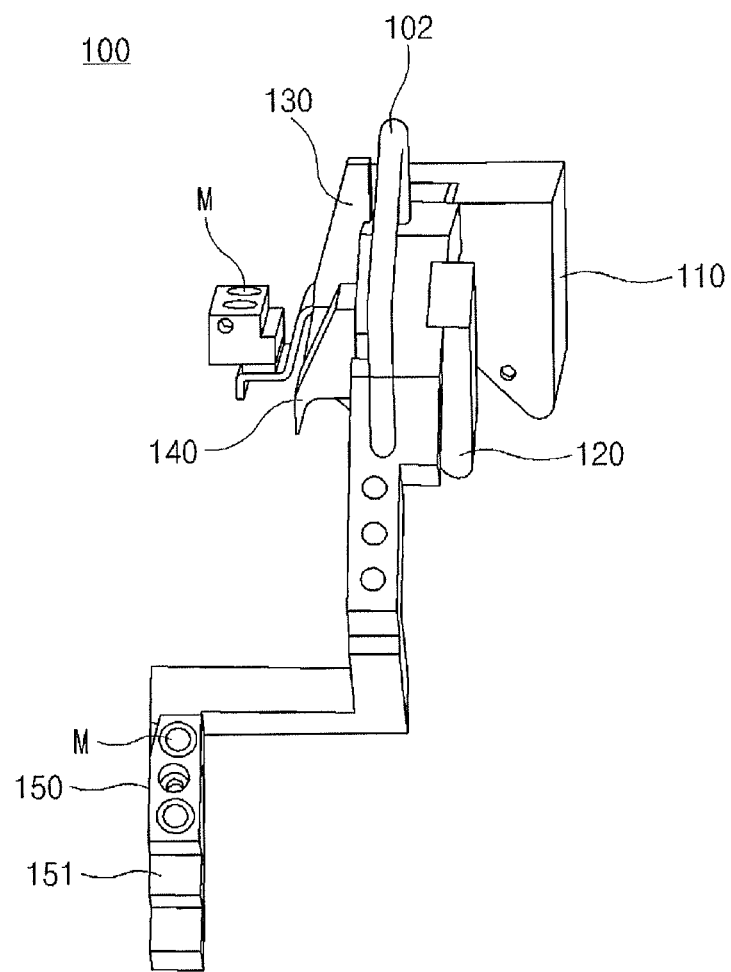

That is, the third jig 130 is extended to a lower portion of the jig body 101 along the inner side of the first jig 110 and has a distal end that is horizontally bent to catch the trunk lid 11 when the trunk lid 11 is mounted on the trunk body 10, thereby making it possible to support the trunk body 11 through the third jig 130, as shown in FIGS. 1 and 5.

The fourth jig 140 is disposed at an inner side of the center of the jig body 101 to guide the trunk lid 11 in the Y direction.

As a result, the fourth jig 140 is a component controlling the trunk lid 11 to be positioned in the Y direction (that is, the left and right direction of the vehicle), similar to the first and second jigs 110 and 120.

Here, a plurality of fourth jigs 140 may be formed in the state in which they are spaced apart from each other by a predetermined gap to facilitate guide of the trunk lid 11 in the Y direction.

The fifth jig 150 is disposed at the rear of the jig body 101 and is extended toward an inner side of a trunk of the vehicle to determine a position of the trunk lid 11 in the X direction.

That is, the fifth jig 150 is extended from a distal end of the jig body 101 toward the trunk and catches the trunk lid 11 when the trunk lid 11 is mounted on the trunk body 10, thereby making it possible to support a rear surface of the trunk lid 11 through the fifth jig 150 to allow several works to be performed in the state of preventing the trunk lid 11 from being completely closed to the trunk body 10, as shown in FIGS. 1 and 5.

In addition, a distal end of the fifth jig 150 is provided with a support part 151 bent.

Meanwhile, a lower portion of the third jig 130 and the support part 151 of the fifth jig 150 may be provided with a magnetic block M to allow the jig part 100 including the third and fifth jigs 130 and 150 to be positioned at the trunk lid 11.

As described above, according to various embodiments of the present invention, the jig part 100 including the jig body 101, the first jig 110, the second jig 120, the third jig 130, and the fourth jig 140 is positioned at the side of the trunk body 10 to allow the trunk lid 11 to be temporarily mounted on the trunk body 10 in the state in which the trunk lid 11 is closed at the time of being mounted, such that generation of a clearance having a predetermined gap between the trunk body 10 and the trunk lid 11 is allowed to be confirmed, thereby making it possible to facilitate a process of assembling the trunk lid 11.

Figure 8:
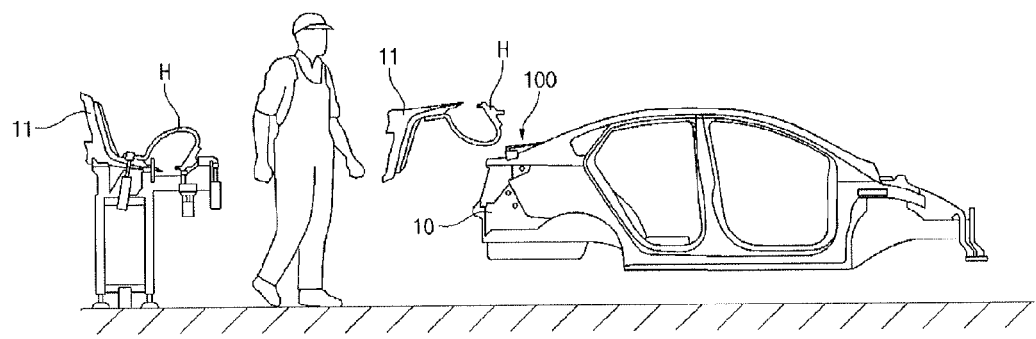
FIG. 8 is a view showing a work process using an exemplary jig device for a trunk lid according to the present invention.

This work process will be described with reference to FIG. 8. The jig part 100 is mounted on the trunk body 10, the trunk lid 11 provided with a hinge H is coupled to and mounted on the trunk body 10 in the state in which the trunk lid 11 is closed, and the jig part 100 is then allowed to be separated from the trunk body 10, thereby making it possible to improve assembling workability of the trunk lid 11, and generation of a clearance between the trunk lid 11 and the trunk body 10 is allowed to be confirmed, thereby making it possible to improve marketability.

As set forth above, according to various embodiments of the present invention, the trunk lid is mounted on the trunk body of the vehicle in the state in which the trunk lid is closed to allow generation of a clearance to be confirmed at the time of performing mounting work, thereby making it possible to improve marketability and work convenience.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A jig device for a trunk lid comprising:
 a jig part for assembling a trunk lid to a trunk body of a vehicle in a state in which the trunk lid is closed, wherein the jig part includes:

a jig body being mounted in a front and rear direction of the vehicle on a side of the trunk body;
a first jig being disposed at a front of the jig body and allowing the jig part to position the trunk lid in a Y direction on the side of the trunk body;
a second jig being disposed at a center of the jig body and allowing the jig part to position the trunk lid in the Y direction on a corner of the trunk body;
a third jig being disposed at an inner side of the first jig and determining a position of the trunk lid in a Z direction;
a fourth jig being disposed at an inner side of the center of the jig body and guiding the trunk lid in the Y direction; and
a fifth jig being disposed at a rear of the jig body and being extended toward an inner side of a trunk of the vehicle and determining a position of the trunk lid in an X direction,
wherein the second jig and a knob are disposed in parallel to each other.

2. The jig device for the trunk lid according to claim 1, wherein the X direction is the front and rear direction of the vehicle, the Y direction is a left and right direction of the vehicle, and the Z direction is a top and bottom direction of the vehicle.

3. The jig device for the trunk lid according to claim 1, wherein the jig body has the knob formed on an upper surface thereof.

4. The jig device for the trunk lid according to claim 1, wherein a distal end of the fifth jig is provided with a support part bent.

5. The jig device for the trunk lid according to claim 4, wherein a lower portion of the third jig and the support part of the fifth jig are provided with a magnetic block.

6. The jig device for the trunk lid according to claim 1, wherein a plurality of fourth jigs are provided so as to be spaced apart from each other by a predetermined gap.

7. The jig device for the trunk lid according to claim 1, wherein a plurality of jig parts are provided.

* * * * *